United States Patent [19]
Faber et al.
[11] 3,977,161
[45] Aug. 31, 1976

[54] CLOSURE CAP FEED CHUTE WITH AUTOMATIC CAP STOP

[75] Inventors: Josef Faber, Lancaster; Henry Wellington Moats, Rushville, both of Ohio

[73] Assignee: Anchor Hocking Corporation, Lancaster, Ohio

[22] Filed: July 28, 1975

[21] Appl. No.: 599,825

[52] U.S. Cl. .................... 53/313; 193/40
[51] Int. Cl.[2] .................... B65B 7/28; B67B 5/00; B65G 11/12; B65G 11/20
[58] Field of Search .............. 53/313, 314, 315, 316; 193/35 A, 40

[56] References Cited

UNITED STATES PATENTS

| | | | |
|---|---|---|---|
| 1,920,539 | 8/1933 | White | 53/314 X |
| 2,304,436 | 12/1942 | Bell | 53/316 |
| 2,518,857 | 8/1950 | Bell | 53/315 X |
| 3,012,388 | 12/1961 | Stover | 53/315 |

*Primary Examiner*—Travis S. McGehee
*Assistant Examiner*—Horace M. Culver
*Attorney, Agent, or Firm*—Holland, Armstrong, Wilkie & Previto

[57] ABSTRACT

An improved chute is disclosed for feeding articles such as closure caps from a supply device with a positive cap operated stop or feed control action. A cap stop is positioned on the feed end of the chute which includes a latching means for positively holding the next to the last cap in a fixed position in the chute while the end cap is held in position by a spring mounted detent. A latch releasing trigger is mounted at the chute end in position to be activated as the end cap is removed from the chute by a moving container. This momentarily opens the cap latch permitting the second cap in line to move to the pick-up position under the trigger which resets the stop latches.

15 Claims, 5 Drawing Figures

CLOSURE CAP FEED CHUTE WITH AUTOMATIC CAP STOP

BACKGROUND OF THE INVENTION

This invention relates to the container sealing art and more particularly to an improved cap feed chute used for feeding closure caps onto the tops of moving containers. An improved stop mechanism is activated by the endmost cap in the chute to provide for a positive stop action on the next cap in line.

Wide spread use is made of cap feeding systems in container sealing machines where the caps are fed under pressure from a cap feeding hopper or other feeder through a chute so that the endmost cap in the chute is picked up by a container being carried beneath the chute. Prior chutes have employed a variety of friction stops or spring detents or the like to hold the end cap within the chute at the container engaging position. Steadily increasing operating speeds for such automatic sealing machines have required greatly increased cap feeding rates with a corresponding increase in cap feed pressure and cap momentum. This, in turn, has resulted in increased difficulty in properly positioning the lowermost cap for correctly engaging a moving container. It has also occasionally resulted in a partial or full feeding of a cap even in the absence of a container.

The improved chute end in accordance with the present invention provides a cap operated positive stop and cap positioning means overcoming these objections. As will be described below, the stop has a positive latching or gate action controlled by the movement of the endmost cap within the cap chute so that its operation is fully synchronized with the movement of the containers being carried beneath the cap chute.

Accordingly, an object of the present invention is to provide an improved cap chute for container sealing machines.

Another object of the present invention is to provide an improved cap chute end having a positive cap stop and cap locator.

Another object of the present invention is to provide an improved cap feed chute end with a positive cap stop operated by the moving caps.

Another object of the present invention is to provide a positive cap stop for a cap feeding chute which is relatively simple and reliable.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein.

DESCRIPTION OF THE PREFERRED EMBODIMENT

Figure 1:
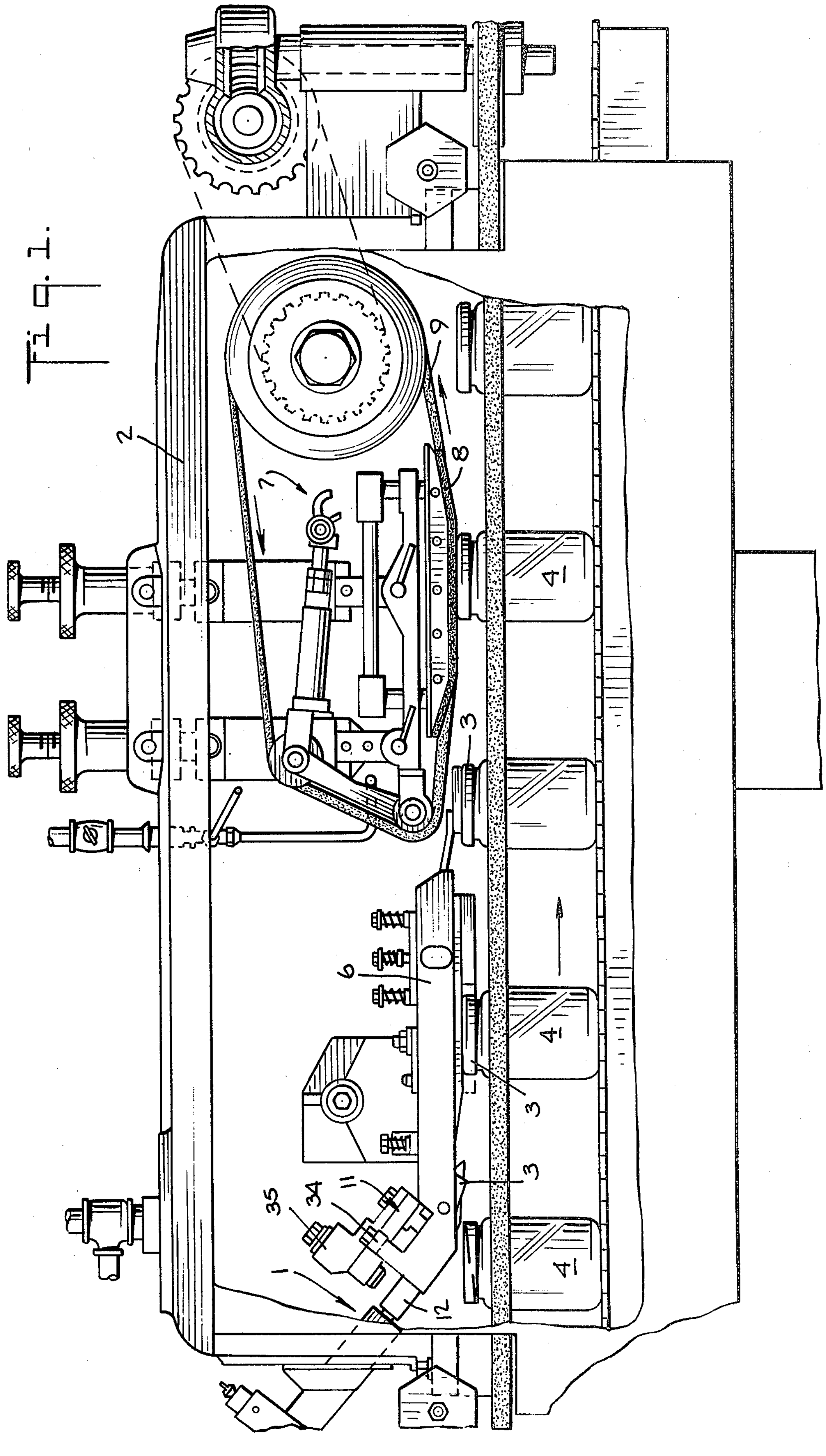
FIG. 1 is a front elevational view, partially cut away, illustrating the cap feeding section and the related pick-up and sealing portions of a typical straight line container sealing machine.
Figure 4:
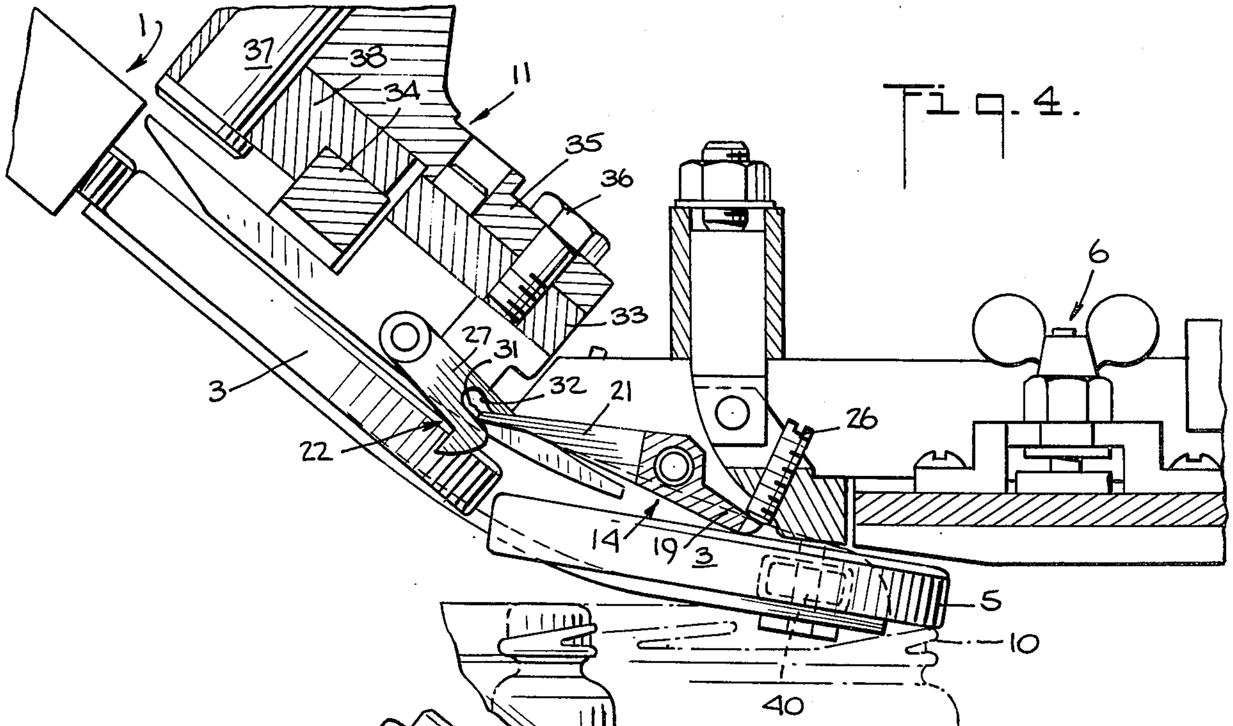
FIG. 4 is a vertical sectional view of the chute end taken along line 4—4 on FIG. 3.

The operation of the improved cap chute will first be described generally with particular reference to FIG. 1 which illustrates a preferred embodiment of a cap chute 1 in position in a typical straight line chamber-type sealing machine 2. The chute 1 is illustrated at the left hand side of FIG. 1 extending downwardly from a cap feeding device (not shown) which feeds a continuous line of caps 3 into the hollow cap feed chute 1. The line of caps 3 extends upwardly in the chute 1 from a lowermost cap 3 at the pick-up point to the caps 3 being fed into the upper end of the chute 1. The line of caps 3 is under a considerable degree of feed force or pressure to insure an adequate supply of the caps 3 for the fast moving containers 4. The lowermost cap 3 is held in position for engagement with a moving container 4 as the rim of each container 4 moves against the skirt 5 of the cap 3 (FIG. 4). The moving containers 4 carry the endmost caps out of the chute 1 and beneath a cap leveling and coaxing means 6. Thereafter, the moving container 4 carries the caps 3 beneath a suitable sealing head which presses or turns the caps 3 onto the containers 4. Sealing head 7 has a drag shoe 8 and a driven sealing belt 9 which cooperate to turn the closure caps 3 onto the container threads 10 in the case of threaded containers.

The improved cap chute end 11 which will now be described in detail with reference to FIGS. 2 through 5 provides a means for precisely positioning the lowermost cap 3 in the chute 1 while at the same time locking the following caps 3 against movement regardless of the amount of feed pressure being exerted by the line of closure caps in the chute 1.

Figure 2:
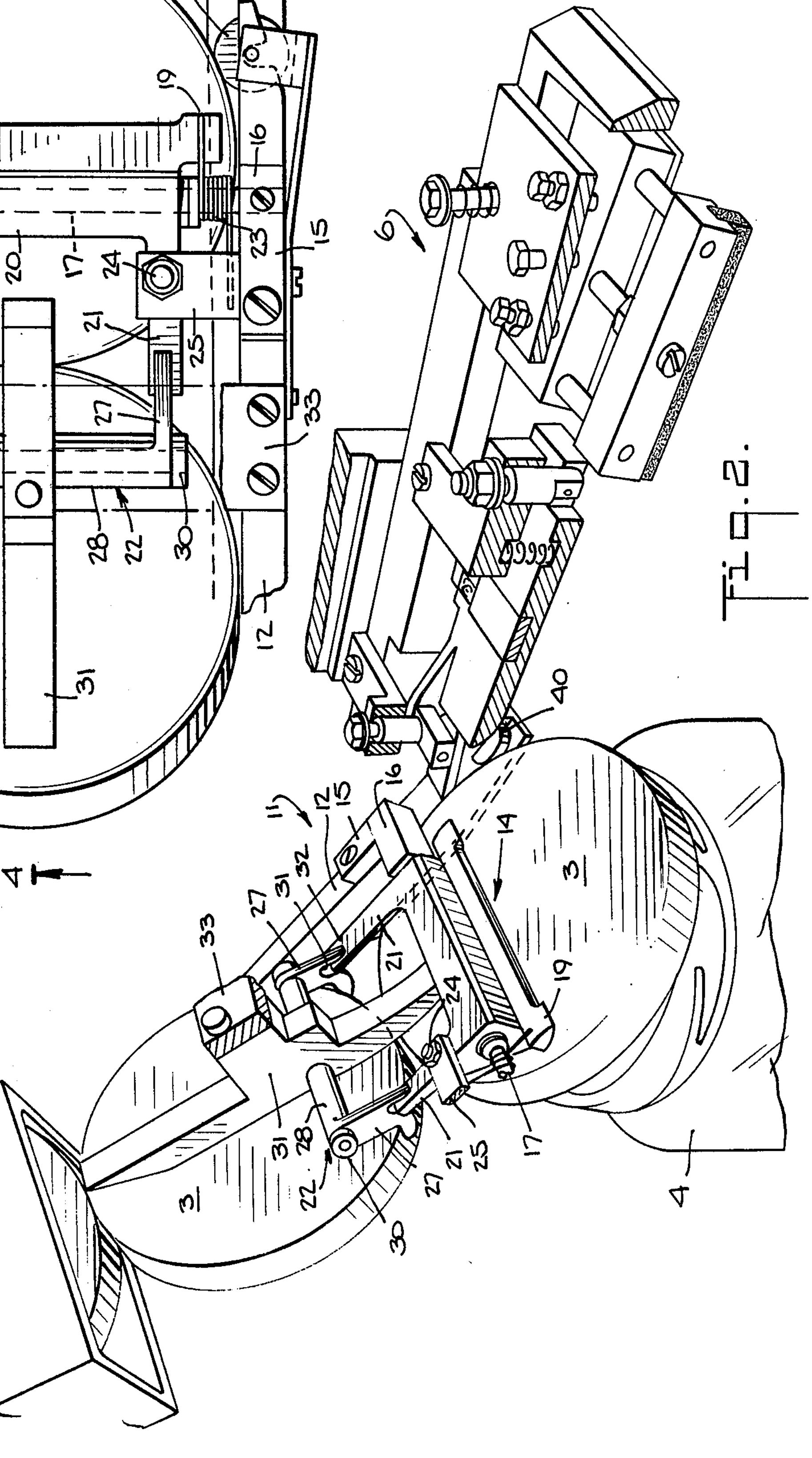
FIG. 2 is a perspective view of the improved chute end in accordance with the invention.

The chute end 11 is removably mounted at the end of any suitable feed chute 1 for directing a line of caps 3 from the feed device to the chute end. Such a chute 1 may comprise spaced rails with cap supporting surfaces and a full or partial cover or an inclined chute 1 as illustrated in FIG. 2. The chute end 11 comprises spaced side rails 12 with cap supporting surfaces 13 positioned to engage opposite sides of the closure caps 3.

A trigger 14 is pivotally mounted across the open top of the cap chute end 11. The trigger 14 is mounted on spaced supports 15 including bearings 16 for a trigger support shaft 17. The trigger 14 has a cap engaging portion 18 and spaced cap engaging feet 19. The portion 18 extends forwardly from an elongated bearing 20. A pair of spaced stop operating arms 21 project rearwardly from the bearing portion 20 to operate a cap latch 22 as will be described below. A coil spring 23 mounted on the trigger support shaft 17 urges the trigger feet 19 downwardly against the cap 3 top. A threaded adjustable stop 24 is mounted on a projecting support 25 on one of the trigger supports 15. The stop 24 is adjusted to control the cap release position of the trigger 14.

Figure 5:
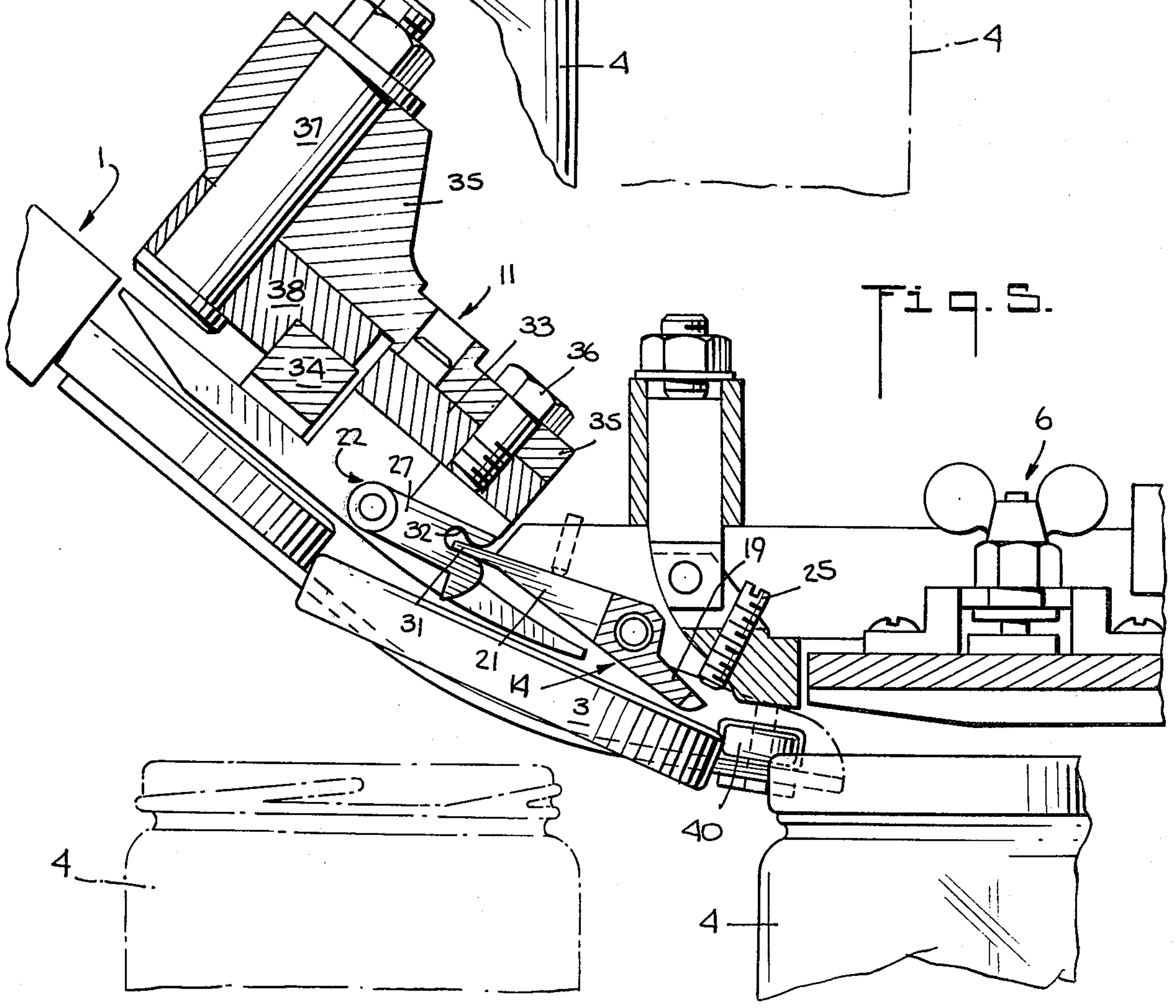
FIG. 5 is a vertical sectional view corresponding to FIG. 4 illustrating the cap release action of the cap stop.

A second threaded and adjustable stop 26 is positioned on an adjacent portion of the coaxing means 6 to set the maximum upward travel of the trigger 14 when engaged by the endmost cap 3 (FIGS. 4 and 5).

The cap latch 22 is pivotally mounted rearwardly of the trigger 14 for operation by the trigger 14. The latch 22 includes a pair of spaced stop arms 27 each mounted on an elongated bearing 28. The bearings 28 are rotatably mounted on a bearing shaft 29 between end nuts 30. The shaft 29 is mounted on an elongated latch support 31, as best seen in FIG. 2, which also acts as a top guide for caps 3 in the chute end 11. Each of the stop arms 27 has a control groove 31 in its free end which is engaged by a free end 32 of a corresponding stop operating arm 21 on the trigger 14. The latch support 31 is mounted on a suitable cross bar 33 attached to the spaced chute end 11 side rails 12. The entire chute end 11 is pivotally mounted on the coaxing means 6 by a cross bar 34 attached to spaced portions of the coaxing means 6 and a pivot arm 35. The pivot arm is attached at its outer end to the chute end cross bar 33 by a bolt 36. The opposite end of the pivot arm is pivotally mounted on a pivot pin 37 connected to a bracket 38 on the cross bar 34. This pivoted mounting permits the chute end 11 to swing about the pivot pin 37 to compensate for variations in the cap pick-up positions of the moving containers 4.

Figure 3:
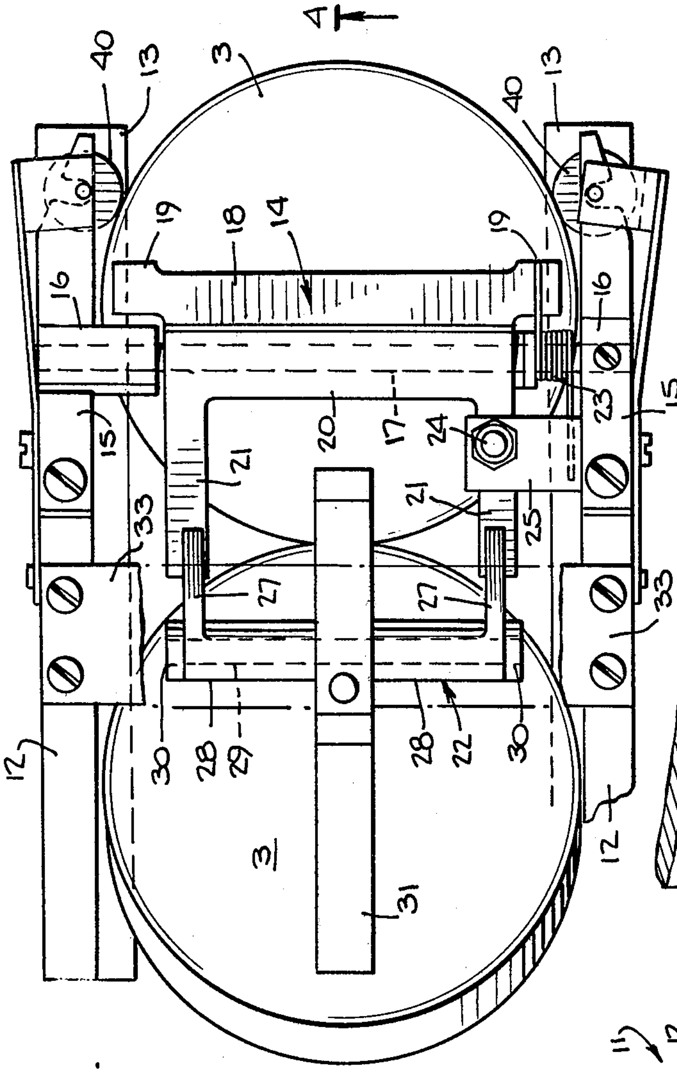
FIG. 3 is a top plan view of the chute end in accordance with the invention.

FIG. 4, for example, illustrates the chute end 11 with an endmost closure 3 in position for being engaged by a moving container 4. The container 4 withdraws the cap 3 from the chute end 11 permitting the feet 19 on the trigger to swing downwardly under the force of the spring 23. This raises the operating arms 21 coupled to the latch 22. The latch 22 swings upwardly releasing the next cap 3 so that it moves to the end of the chute under the influence of the cap chute feed pressure (FIG. 5). As this next cap 3 moves into position against spaced spring loaded detents 40, its cover engages the feet 19 on the trigger 14 raising the feet 19 and again lowering the trigger operating arms 21 and the interconnected latch stop arms 27. The space between the opposed rounded skirts of the caps 3, as illustrated in FIG. 3, permits the latch stop arms 27 to drop downwardly into position to engage spaced portions of the following cap 3 thereby locking it against further forward movement and behind the endmost cap 3 at the detents 40. This positive latching or locking of the following closure again holds it and the following line of closures in the cap chute stationary even though the line of closures may be under considerable feed force or pressure from the cap feeding device. The spacing of the two latch stop arms 27, illustrated in FIG. 3, takes advantage of the space existing between adjacent closure caps 3 in the cap chute end 11 due to the circular nature of the closures. This permits the spaced trigger feet 19 to engage the end cap and to lower the latch stop arms 27 before the endmost cap 3 reaches the spaced detents 40 and prior to the arrival of the second cap 3 at the desired stop position in contact with the spaced latch stop arms 27.

It will be seen that an improved stop means has been provided for the high speed feeding of articles in a chute arrangement, such as a closure cap feed chute for use in high speed sealing machines. The stop provides a positive action locking the closure caps in the feed chute in a desired feed position and prevents the unintentional feeding of caps even though a high feed pressure is employed. The stop is relatively simple while being precise and effective in action and being operated by the movement of the caps or other articles being fed through the chute.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a cap feed chute for feeding a line of caps to moving containers an improved stop comprising the combination of:

a trigger positioned at the exit end of the chute for engaging the endmost cap for movement thereby;

means for mounting said trigger for movement by the endmost cap;

a latch for engaging one of the caps in the line of caps behind the said endmost cap;

means for movably mounting said latch rearwardly of said trigger;

means operatively coupling said latch to said trigger for movement thereby; and said coupling being positioned whereby said latch engages a closure cap only when a preceding cap is in engagement with said trigger.

2. The cap feed chute as claimed in claim 1 which further comprises a foot portion on said trigger positioned for slidably engaging top portions of caps in said chute, and a stop arm portion on said latch positioned for engaging edges of closure caps at a position spaced from the center line of cap travel through the chute.

3. The cap feed chute as claimed in claim 1 which further comprises a pair of stop arm portions on said latch for engaging the edges of closure caps, one of said stop arms being positioned on one side of the center line of cap travel through the feed chute and with the other stop arm being positioned on the opposite side of the center line.

4. The cap feed chute as claimed in claim 1 in which said means for movably mounting said trigger comprises a shaft mounted transversely of the feed chute engaging a bearing portion on said trigger, and resilient means urging said trigger towards the tops of caps in said feed chute.

5. The cap feed chute as claimed in claim 1 in which said means for movably mounting said latch comprises a shaft mounted transversely of the cap feed chute.

6. The cap feed chute as claimed in claim 1 in which said trigger and said latch are each mounted on spaced shafts mounted transversely of the cap feed chute, and said means operatively coupling said latch and said trigger couples facing portions whereby a turning of the trigger in one direction about its mounting shaft turns said latch in an opposite direction about its mounting shaft.

7. The cap feed chute as claimed in claim 1 in which said latch includes a pair of spaced stop arms for engaging closure caps, and said means for operatively coupling said latch to said trigger comprises a pair of operating arms on said trigger with one operating arm operatively engaging each of said stop arms on said latch.

8. The cap feed chute as claimed in claim 1 which further comprises cap detent means mounted at the end of said cap feed chute for releasably engaging closure caps at the chute end adjacent to said trigger.

9. The cap feed chute as claimed in claim 1 in which said cap feed chute includes means for detachably mounting it at the end of a second cap feed chute for receiving caps from said second cap feed chute.

10. The cap feed chute as claimed in claim 9 in which said means for mounting said cap chute on said second cap feed chute includes a pivot means.

11. In a cap feed chute for feeding a line of caps to moving containers an improved stop comprising the combination of:

a trigger positioned at the exit end of the chute for engaging the endmost cap for movement thereby;

said trigger having a foot positioned for engaging each cap cover;

means for pivotally mounting said trigger for movement by the endmost cap;

cap detent means mounted at the end of said cap feed chute for releasably engaging closure caps at the chute adjacent to said trigger;

a latch for engaging one of the caps in the line of caps behind the said endmost cap;

said latch having a stop arm positioned outwardly of the feed chute center line for releasably engaging caps in said feed chute;

means for pivotally mounting said latch rearwardly of said trigger;

means operatively coupling facing portions of said latch and said trigger whereby pivotal movement of said trigger in one direction pivots said latch in the opposite direction; and said coupling being positioned whereby said latch stop arm engages a closure cap only when a preceding cap is in engagement with said trigger foot.

12. The cap feed chute as claimed in claim 11 in which said means for movably mounting said latch comprises a shaft positioned transversely of the cap feed chute.

13. The cap feed chute as claimed in claim 11 in which said latch includes a pair of spaced stop arms for engaging closure caps, and said means for operatively coupling said latch to said trigger comprises a pair of operating arms on said trigger with one operating arm operatively engaging each of said stop arms on said latch.

14. The cap feed chute as claimed in claim 11 in which said cap feed chute includes means for detachably mounting it at the end of a second cap feed chute for receiving caps from said second cap feed chute.

15. The cap feed chute as claimed in claim 14 in which said means for mounting said cap chute on said second cap feed chute includes a pivot means.

* * * * *